(12) United States Patent
Inbaraj et al.

(10) Patent No.: US 10,848,839 B2
(45) Date of Patent: Nov. 24, 2020

(54) OUT-OF-BAND TELEMETRY DATA COLLECTION

(71) Applicant: American Megatrends International, LLC, Norcross, GA (US)

(72) Inventors: Joseprabu Inbaraj, Suwanee, GA (US); Muthukkumaran Ramalingam, Duluth, GA (US)

(73) Assignee: AMERICAN MEGATRENDS INTERNATIONAL, LLC, Norcross, GA (US)

(*) Notice: Subject to any disclaimer, the term of this patent is extended or adjusted under 35 U.S.C. 154(b) by 0 days.

(21) Appl. No.: 15/618,564

(22) Filed: Jun. 9, 2017

(65) Prior Publication Data
US 2018/0359184 A1    Dec. 13, 2018

(51) Int. Cl.
*H04Q 9/02* (2006.01)
*H04Q 9/00* (2006.01)

(52) U.S. Cl.
CPC .......... *H04Q 9/02* (2013.01); *H04Q 9/00* (2013.01); *H04Q 2209/10* (2013.01); *H04Q 2209/30* (2013.01); *H04Q 2209/75* (2013.01)

(58) Field of Classification Search
CPC . H04W 4/02; H04Q 2209/75; H04Q 2209/30; H04Q 9/02; H04Q 2209/10; H04L 43/08; H04L 47/12
See application file for complete search history.

(56) References Cited

U.S. PATENT DOCUMENTS

| | | | | |
|---|---|---|---|---|
| 6,088,659 A | * | 7/2000 | Kelley | G01D 4/004 340/870.02 |
| 6,338,011 B1 | * | 1/2002 | Furst | G01S 7/003 342/159 |
| 2004/0032340 A1 | * | 2/2004 | Lingafeldt | H04M 11/002 340/870.02 |
| 2005/0021306 A1 | * | 1/2005 | Garcea | G06F 11/3447 702/186 |
| 2006/0206698 A1 | * | 9/2006 | Foucher | G06F 21/577 713/1 |
| 2006/0247710 A1 | * | 11/2006 | Goetz | A61N 1/37211 607/30 |
| 2010/0229023 A1 | * | 9/2010 | Gross | G06F 11/0724 714/2 |
| 2015/0046512 A1 | * | 2/2015 | Ashby | H04L 43/08 709/203 |
| 2015/0149850 A1 | * | 5/2015 | Leach | H04L 43/08 714/751 |
| 2015/0208195 A1 | * | 7/2015 | Kariman | H04W 4/02 455/456.1 |
| 2018/0131745 A1 | * | 5/2018 | Shakir | H04L 43/10 |

* cited by examiner

*Primary Examiner* — Michael Thier
*Assistant Examiner* — Nevena Zecevic Sandhu
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a service processor. The service processor collects telemetry data from a host. The service processor manages the host. The service processor determines a subset of the telemetry data that are subscribed by a subscriber. The service processor sends the subset of the telemetry data to the subscriber.

14 Claims, 5 Drawing Sheets

OUT-OF-BAND TELEMETRY DATA COLLECTION

BACKGROUND

Field

The present disclosure relates generally to computer systems, and more particularly, to a service processor that collects and services telemetry data of a host through an out-of-band network.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. A BMC may be considered as an embedded-system device and also a service processor.

Telemetry services provided in a data network may increase data traffic in the data network. Therefore, there is a need for a mechanism that can reduces data traffic generated by the telemetry services in the data network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a service processor. The service processor collects telemetry data from a host. The service processor manages the host. The service processor determines a subset of the telemetry data that are subscribed by a subscriber. The service processor sends the subset of the telemetry data to the subscriber.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
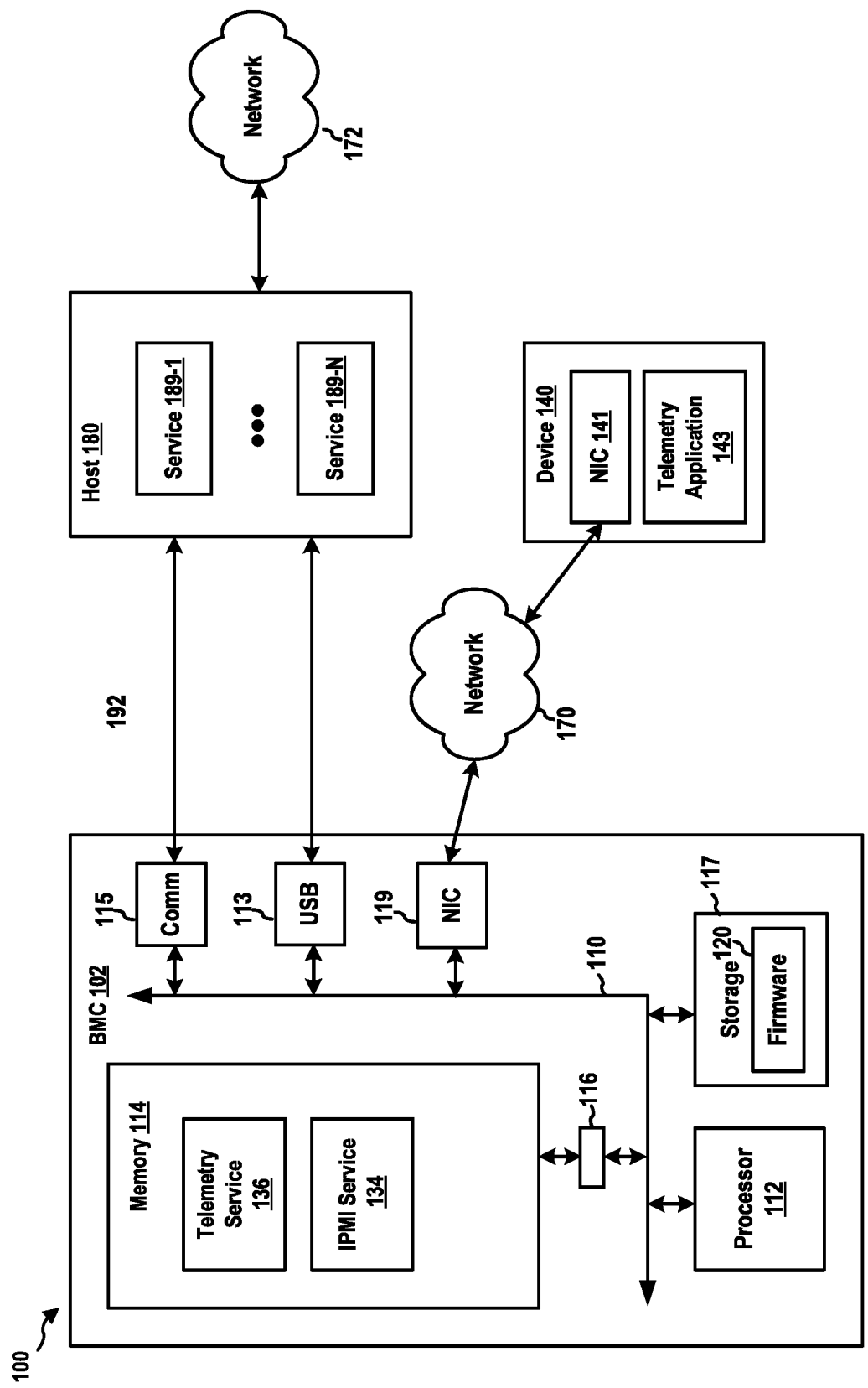
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating a computer system. In this example, the computer system includes, among other devices, a BMC 102, a host computer 180, and a telemetry subscriber device 140.

The BMC 102 has a processor 112, a memory 114, a memory driver 116, a storage 117, a network interface card 119, a USB interface 113, and communication interfaces 115. The communication interfaces 115 may include a keyboard controller style (KCS), a server management interface chip (SMIC), a block transfer (BT) interface, a system management bus system interface (SSIF), and/or other suitable communication interface(s). Further, the BMC 102 may support IPMI and may provide an IPMI interface between the BMC 102 and the host computer 180. The IPMI interface may be implemented over one or more of the USB interface 113, the network interface card 119, and the communication interfaces 115. In addition, the memory 114, the processor 112, the memory driver 116, the storage 117, the communication interfaces 115, and/or the network interface card 119 may be in communication with each other through a communication channel 110 such as a bus architecture.

The BMC 102 may store BMC firmware 120 in the storage 117. When the processor 112 executes the BMC firmware 120, the processor 112 loads code and data of the BMC firmware 120 into the memory 114. This example shows that the BMC firmware 120 provides in the memory 114, among other components an IPMI service 134 and a telemetry service 136.

The BMC 102 may be in communication with the host computer 180 through the USB interface 113, the network interface card 119, the communication interfaces 115, and/or the IPMI interface. The host computer 180 may include, among other components, host services 189-1 to 189-N. Further, the BMC 102 may manage the host computer 180 in accordance with IPMI. In particular, the IPMI service 134 may receive and send IPMI messages to the host computer 180 through the IPMI interface. Further, the host computer 180 may be connected to a data network 172. In one example, the host computer 180 may be a computer system in a data center. Through the data network 172, the host services 189-1 to 189-N on the host computer 180 may exchange data with services on other computer systems in the data center or exchange data with machines on the Internet.

Further, the BMC 102 may be in communication with the telemetry subscriber device 140 through a communication network 170 (e.g., a local area network (LAN)). In this example, the BMC 102 may be in communication with the communication network 170 through the network interface card 119. Further, the communication network 170 may be isolated from the data network 172 and out-of-band to the data network 172. In certain configurations, the communication network 170 may not be connected to the Internet.

The telemetry subscriber device 140 may include a network interface card 141, through which the telemetry subscriber device 140 is connected to the communication network 170. The telemetry subscriber device 140 may also include a telemetry application 143.

Figure 2:
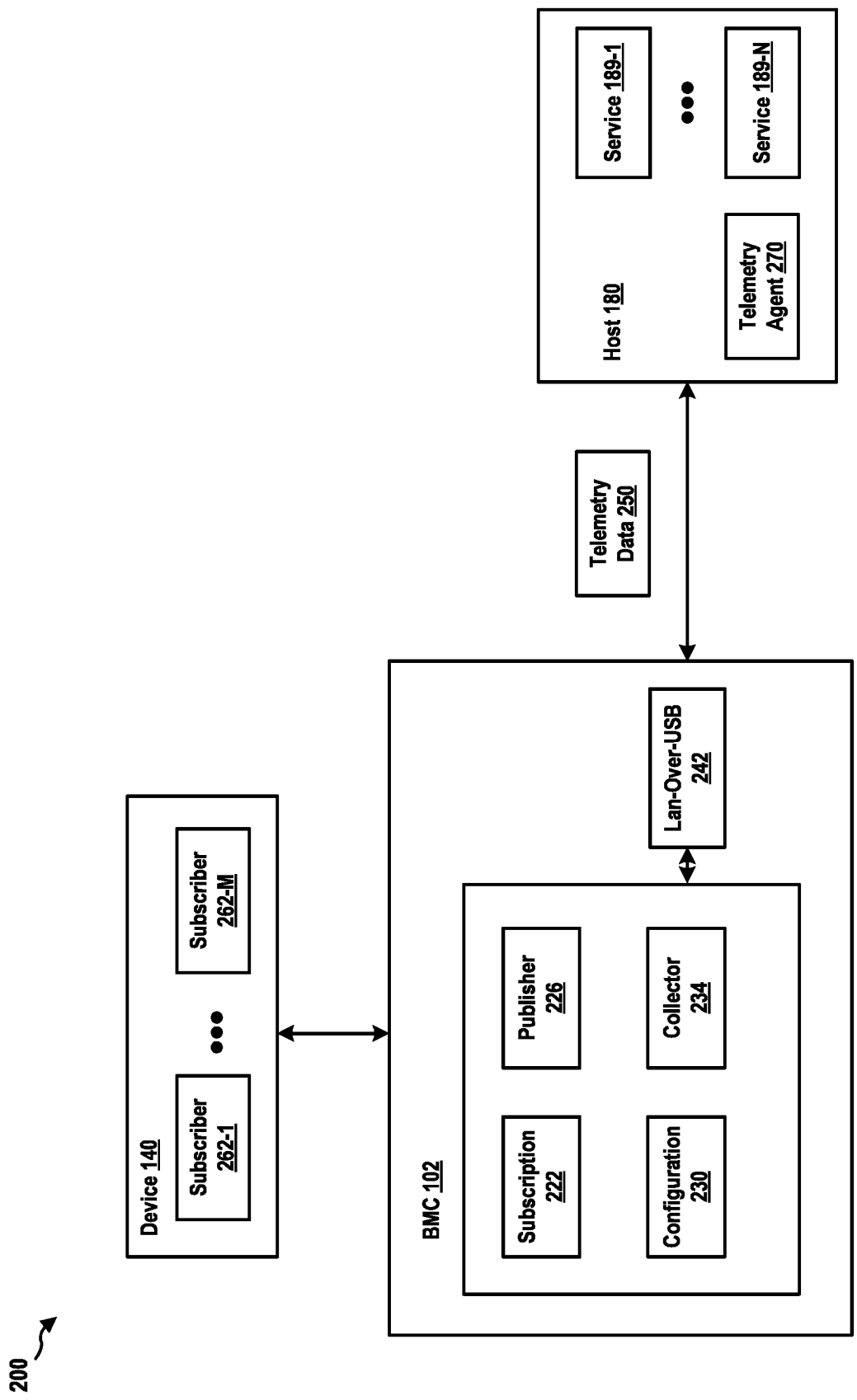
FIG. 2 is another diagram illustrating the computer system of FIG. 1.

FIG. 2 is another diagram 200 illustrating the computer system of FIG. 1. The telemetry service 136 on the BMC 102 includes a subscription component 222, a configuration component 230, a publisher component 226, and a collector component 234. As described supra, the BMC 102 (accordingly, the telemetry service 136) and the host computer 180 may communicate with each other through one or more of the USB interface 113, the network interface card 119, and the communication interfaces 115. In this example, the telemetry service 136 may be in communication with the host computer 180 through the USB interface 113. Further, the BMC 102 and the host computer 180 may support Local Area Network over Universal Serial Bus (LAN-over-USB). In particular, the BMC 102 may implement a LAN-over-USB interface 246 over the USB interface 113. As such, the BMC 102 may exchange Ethernet frames/packets with the host computer 180 over a communication link using the LAN-over-USB interface 246. The communication link is isolated from the data network 172 and is out-of-band to the data network 172.

Each of the host services 189-1 to 189-N on the host computer 180 supports telemetry and may provide a function that can be called to retrieve telemetry data 250 from those services. Further, some of the host services 189-1 to 189-N may support a remote application program interface (API) or a remote procedure call (RPC) procedure. As such, the collector component 234 of the telemetry service 136 may call the functions of those services remotely by using the remote API or RPC over the LAN-over-USB interface 246 to retrieve the telemetry data 250 from those services. Further, the host computer 180 may include a telemetry agent 270 that is in communication with the telemetry service 136 (e.g., through the LAN-over-USB interface 246). Where a service of the host services 189-1 to 189-N does not support a remote API or a RPC procedure, the telemetry agent 270 may call the telemetry function of that service locally to retrieve the telemetry data 250 and stores the telemetry data 250 at the telemetry agent 270. Subsequently, the collector component 234 may call the telemetry agent 270 to obtain the stored telemetry data 250.

The telemetry data 250 is a broad term used to describe information about the state or condition of the host computer 180 or the host services 189-1 to 189-N. The host services 189-1 to 189-N may include an operating system (OS) of the host computer 180, a MICROSOFT® EXCHANGE® server or other email servers, an ORACLE® database server or other database servers, and/or an APACHE® web server or other web servers. For example, the telemetry data 250 may include metrics that measuring operation or performance of the host services 189-1 to 189-N. As an example, the telemetry data 250 may indicate CPU usage and memory usage of each of the host services 189-1 to 189-N. Further, depending on the nature of the host services 189-1 to 189-N, the telemetry data 250 may include parameters specifying one or more of an operating system version, whether antivirus software is running and if so when the antivirus software was last updated, whether any threat has been detected and if so whether the threat cleaned successfully, whether backup are being performed at the host computer 180, whether firewall protection is enabled at the host computer 180, when the last software update was applied, particular events generated by components of the host computer 180, error conditions encountered by software of host computer 180, unhandled issues related to particular features (i.e., new backup file extensions) of the host computer 180, startup time of the system, last defragmentation of hard drive, so on and so forth.

The configuration component 230 of the telemetry service 136 may include configuration data for configuring the collector component 234. Based on the configuration data, the collector component 234 may determine how to communicate with the host services 189-1 to 189-N and how to collect the telemetry data 250 from the host services 189-1 to 189-N. For example, based on the configuration data, the collector component 234 may determine what communication protocol should be used and what function of a particular service should be called in order to obtain the telemetry data 250 of that particular service. The configuration data may also indicate a respective frequency for retrieving the telemetry data 250 from each service of the host services 189-1 to 189-N and a respective address (e.g., in the form of a uniform resource locator (URL)) at which the telemetry data 250 of each service are made available.

Further, the configuration data may also indicate whether only some (not all) of the telemetry data 250 of a service are to be collected by the collector component 234. For example, the configuration data may indicate that only a particular subset (e.g., only CPU usage data, but not memory usage data) of the telemetry data 250 are to be collected by the collector component 234.

The subscription component 222 provides a subscription service of the telemetry application 143. The telemetry application 143 of the telemetry subscriber device 140 may send an inquiry to the subscription component 222 to obtain information regarding the telemetry data 250 available for subscription at the telemetry service 136. Based on the response from the telemetry service 136, the telemetry application 143 may subscribe to the telemetry service 136 for receiving certain subsets of the telemetry data 250 of the host computer 180 from the telemetry service 136. The telemetry application 143 may include subscribers 262-1 to 262-M each subscribing to a particular subset (or type) of the telemetry data 250 from the telemetry service 136. For example, the subscriber 262-1 may subscribe only the CPU usage metrics of the host services 189-1. To subscribe, the subscriber 262-1 may send a subscription request to the subscription component 222. The subscription request may include user credentials of the subscriber 262-1. The subscription component 222 may include an authentication manager for verifying credentials of a subscriber. The subscription request may also indicate the interested service and/or the polling interval of a subscriber. The subscription component 222 may send the polling interval to the configuration component 230, which may accordingly set up the frequency for retrieving the telemetry data 250 from the service. In response to the subscription request, the telemetry service 136 may send a subscription response to the subscriber 262-1. The response may include a URL serviced by the publisher component 226 of the telemetry service 136. As described infra, the subscriber 262-1 may retrieve the telemetry data 250 of the interested service at the URL.

As described supra, the telemetry application 143 may include the subscribers 262-1 to 262-M. Each of the subscribers 262-1 to 262-M may subscribe the same or different subsets of telemetry data 250 of the host services 189-1 to 189-N from the telemetry service 136. In addition, telemetry applications or subscribers on other devices may similarly subscribe to the telemetry service 136.

After the collector component 234 receives or retrieves the telemetry data 250 from the host services 189-1 to 189-N, the collector component 234 may aggregate the telemetry data 250 and forward or report the aggregated telemetry data 250 to the publisher component 226 for analysis and publication. Based on the information from the subscription component 222, the publisher component 226 can determine a respective subset of the telemetry data 250 to be provided to each of the subscribers 262-1 to 262-M. As described supra, in certain configurations, the publisher component 226 may include a web server and may make the respective subsets of telemetry data 250 available at respective URLs for retrieval by the subscribers 262-1 to 262-M. In certain configurations, the subscription component 222 may send a message containing the respective subset of the telemetry data 250 to the respective subscriber.

The telemetry data 250 received by the collector component 234 from the host computer 180 may be formatted in eXtensible Markup Language (XML) or JavaScript Object Notation (JSON). Furthermore, the collector component 234 may analyze the telemetry data 250 received, and notify subscribers one or more support issues identified while analyzing the subscribed telemetry data 250. For example, the telemetry data 250 may indicate a performance or security issue at a service of the host services 189-1 to 189-N that should be remedied.

Figure 3:
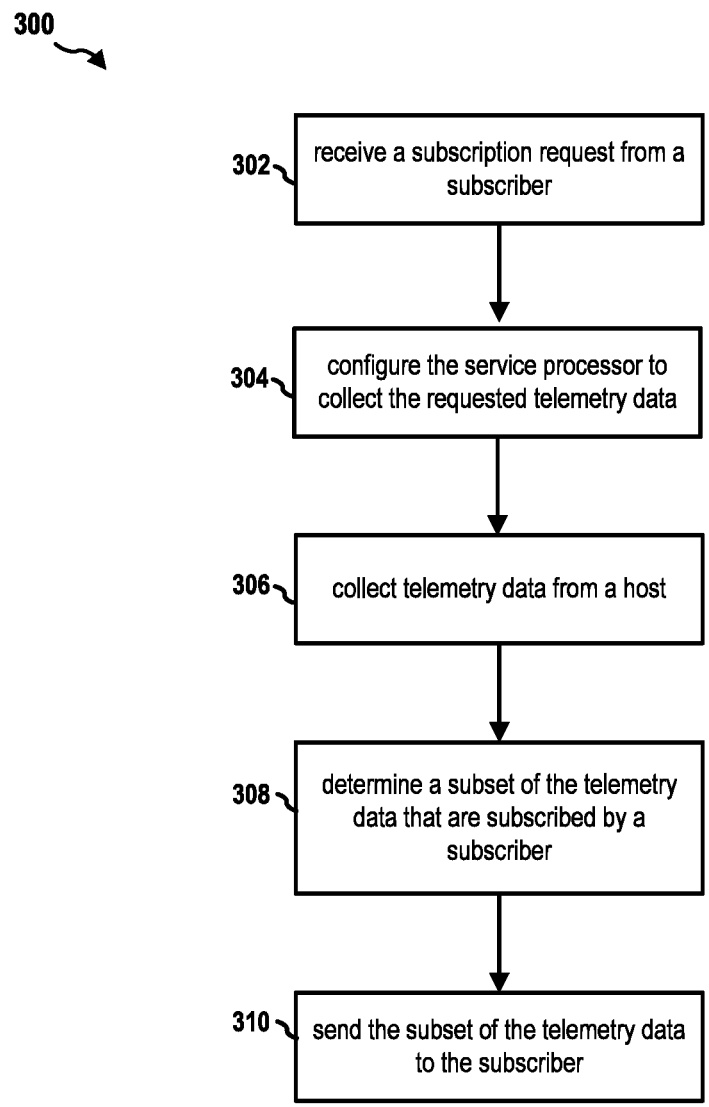
FIG. 3 is a flow chart of a method (process) for managing telemetry data.

FIG. 3 is a flow chart 300 of a method (process) for managing telemetry data. The method may be performed by a service processor (e.g., the BMC 102, the apparatus 102'). At operation 302, the service processor receives a subscription request from a subscriber (e.g., the subscriber 262-1) through a communication network. The subscription request indicates a service of a host (e.g., the host computer 180) of the service processor and a type of telemetry data. The service processor manages the host. At operation 304, the service processor accordingly configures itself to collect the requested type of telemetry data. In certain configurations, the telemetry data include metrics measuring operation of one or more services (e.g., the host services 189-1 to 189-N) of the host.

At operation 306, the service processor collects telemetry data from the host. In certain configurations, the service processor establishes a communication link with the host. The communication link is out-of-band of a data network (e.g., the data network 172) of the host. The telemetry data is collected through the communication link. In certain configurations, the communication link is a LAN-over-USB link (e.g., a communication link using the LAN-over-USB interface 246). In certain configurations, the service processor calls a telemetry function of the service of the host through a remote API or an RPC procedure to collect the telemetry data.

At operation 308, the service processor determines a subset of the telemetry data (e.g., the telemetry data 250) that are subscribed by the subscriber based on the subscription request. At operation 310, the service processor sends the subset of the telemetry data to the subscriber. In certain configurations, the service processor is in communication with the subscriber through a communication network (e.g., the communication network 170) that is out-of-band of a data network of the host. The subset of the telemetry data is sent to the subscriber through the communication network.

Figure 4:
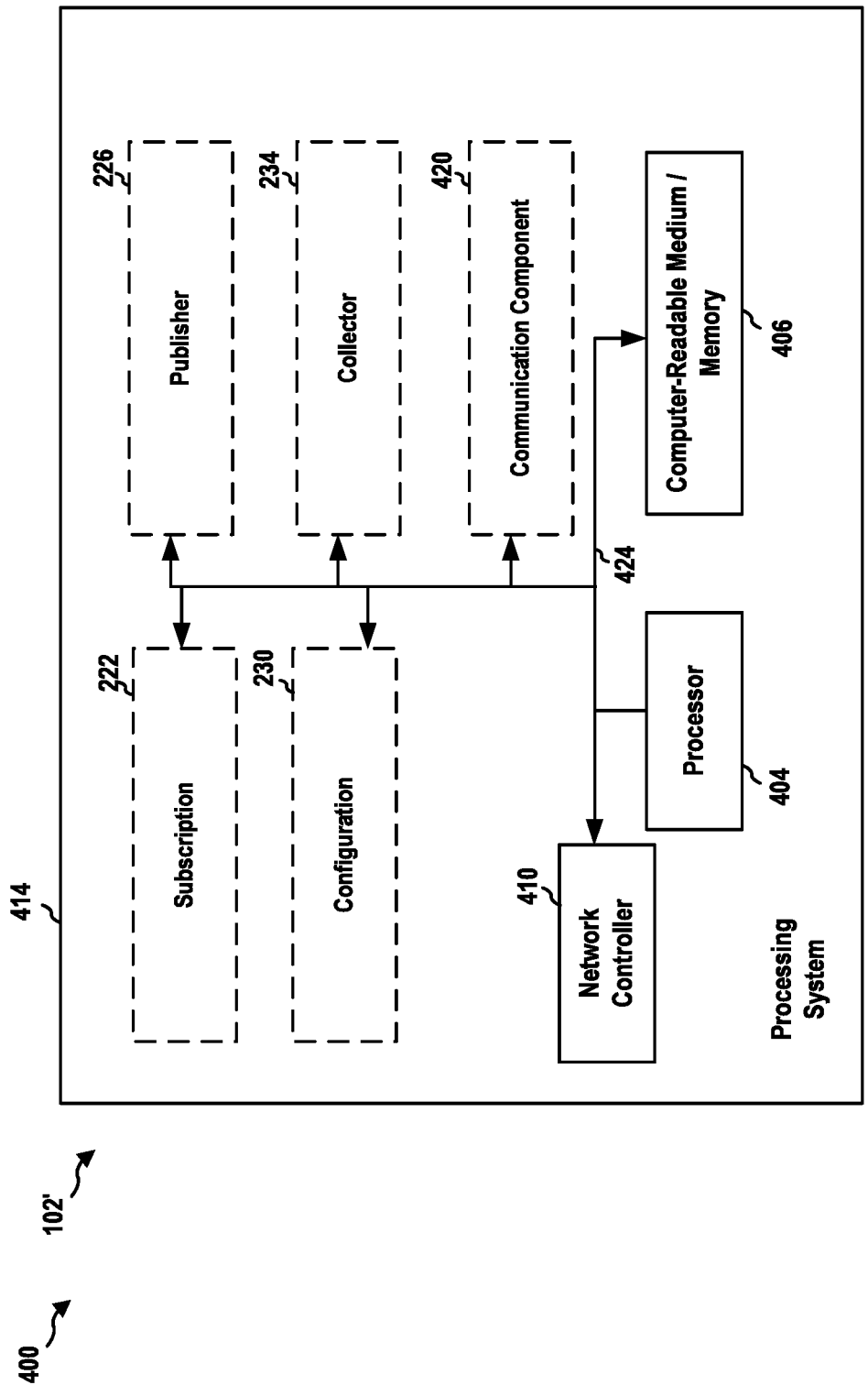
FIG. 4 is a diagram illustrating an example of a hardware implementation for an apparatus employing a processing system.

FIG. 4 is a diagram 400 illustrating an example of a hardware implementation for an apparatus 102' employing a processing system 414. The apparatus 102' may implement the BMC 102. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the computer-readable medium/memory 406, a network controller 410, etc. The bus 424 may also link various other circuits such as timing sources, peripherals, voltage regulators, and power management circuits, which are well known in the art, and therefore, will not be described any further.

The processing system 414 may be coupled to the network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 102'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the subscription component 222, the publisher component 226, the configuration component 230, the collector component 234. The components may be software components running in the processor 404, resident/stored in the computer readable medium/memory 406, one or more hardware components coupled to the processor 404, or some combination thereof.

The apparatus 102' may be configured to include means for performing operations described supra referring to FIG. 3. The aforementioned means may be one or more of the aforementioned components of the apparatus 102 and/or the processing system 414 of the apparatus 102' configured to perform the functions recited by the aforementioned means.

Figure 5:
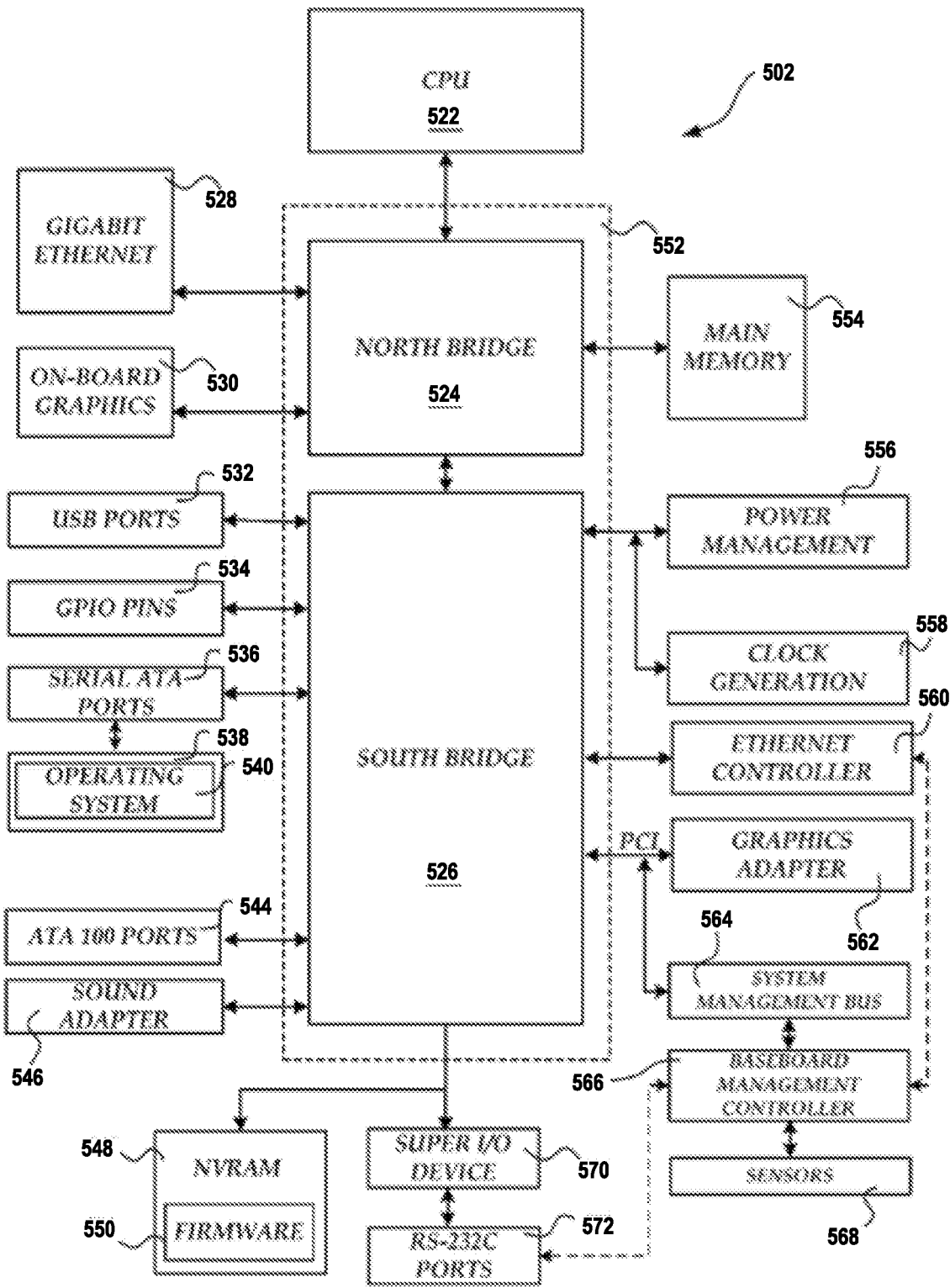
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 180, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a service processor, comprising:
establishing, at the service processor of a host, a communication link with the host through a local non-networked communication interface between the service processor and the host, wherein the communication link is out-of-band of a data network of the host;

executing, at a processing unit of the service processor, a first set of instructions to implement a baseboard management controller (BMC), wherein the BMC manages the host;

remotely calling, at the service processor, a telemetry agent at the host to retrieve telemetry data, wherein the telemetry agent locally calls a telemetry function of one or more services of the host to collect the telemetry data and stores the telemetry data at the telemetry agent;

retrieving, by the service processor and from the telemetry agent at the host, the telemetry data on the communication link through the local non-networked communication interface;

executing, at the processing unit of the service processor, a second set of instructions to implement a subscription service for the host;

receiving, at the subscription service of the service processor, a subscription request from a subscriber at a remote device to subscribe a subset of the telemetry data, the subset being less than the entirety of the telemetry data;

determining, at the subscription service of the service processor, the subset of the telemetry data that are subscribed by the subscriber; and sending, at the subscription service of the service processor, the subset of the telemetry data to the subscriber, wherein the service processor is in communication with the subscriber through a communication network that is out-of-band of the data network of the host such that the subscriber is isolated from the data network through which the host is in communication with other computer systems, wherein the subset of the telemetry data is sent to the subscriber through the communication network.

2. The method of claim 1, wherein the telemetry data include metrics measuring operation of the one or more services of the host.

3. The method of claim 1, wherein the communication link is a Local Area Network over Universal Serial Bus (LAN-over-USB) link.

4. The method of claim 1, further comprising:
calling the telemetry function of a service of the host through a remote application program interface (API) or a remote procedure call (RPC) procedure.

5. The method of claim 1, further comprising receiving the subscription request from the subscriber through the communication network, wherein the subscription request indicates a service of the host and a type of telemetry data, wherein the subset of the telemetry data is determined based on the subscription request.

6. An apparatus, the apparatus being a service processor, comprising:
a memory; and
at least one processor coupled to the memory and configured to:
implement a baseboard management controller (BMC), wherein the BMC manages a host;
establish, at the service processor of the host, a communication link with the host through a local non-networked communication interface between the service processor and the host, wherein the communication link is out-of-band of a data network of the host;
remotely call, at the service processor, a telemetry agent at the host to retrieve telemetry data, wherein the telemetry agent locally calls a telemetry function of one or more services of the host to collect the telemetry data and stores the telemetry data at the telemetry agent;
retrieve, by the service processor and from the telemetry agent at the host, the telemetry data on the communication link through the local non-networked communication interface;
implement a subscription service for the host;
receive, at the subscription service of the service processor, a subscription request from a subscriber at a remote device to subscribe a subset of the telemetry data, the subset being less than the entirety of the telemetry data;
determine, at the subscription service of the service processor, the subset of the telemetry data that are subscribed by the subscriber; and
send, at the subscription service of the service processor, the subset of the telemetry data to the subscriber, wherein the service processor is in communication with the subscriber through a communication network that is out-of-band of the data network of the host such that the subscriber is isolated from the data network through which the host is in communication with other computer systems, wherein the subset of the telemetry data is sent to the subscriber through the communication network.

7. The apparatus of claim 6, wherein the telemetry data include metrics measuring operation of the one or more services of the host.

8. The apparatus of claim 6, wherein the communication link is a Local Area Network over Universal Serial Bus (LAN-over-USB) link.

9. The apparatus of claim 6, wherein the at least one processor is further configured to:
call the telemetry function of a service of the host through a remote application program interface (API) or a remote procedure call (RPC) procedure.

10. The apparatus of claim 6, wherein the at least one processor is further configured to receive the subscription request from the subscriber through the communication network, wherein the subscription request indicates a service of the host and a type of telemetry data, wherein the subset of the telemetry data is determined based on the subscription request.

11. A non-transitory computer-readable medium storing computer executable code for operating a service processor, comprising code, when executed on a processing unit of the service processor, to:
implement a baseboard management controller (BMC), wherein the BMC manages a host;
establish, at the service processor of the host, a communication link with the host through a local non-networked communication interface between the service processor and the host, wherein the communication link is out-of-band of a data network of the host;
remotely call, at the service processor, a telemetry agent at the host to retrieve telemetry data, wherein the telemetry agent locally calls a telemetry function of one or more services of the host to collect the telemetry data and stores the telemetry data at the telemetry agent;
retrieve, by the service processor, the telemetry data from the telemetry agent at the host through the communication link;
implement a subscription service for the host;
receive, at the subscription service of the service processor, a subscription request from a subscriber at a remote device to subscribe a subset of the telemetry data, the subset being less than the entirety of the telemetry data;

determine, at the subscription service of the service processor, the subset of the telemetry data that are subscribed by the subscriber; and send, at the subscription service of the service processor, the subset of the telemetry data to the subscriber, wherein the service processor is in communication with the subscriber through a communication network that is out-of-band of the data network of the host such that the subscriber is isolated from the data network through which the host is in communication with other computer systems, wherein the subset of the telemetry data is sent to the subscriber through the communication network.

12. The non-transitory computer-readable medium of claim 11, wherein the telemetry data include metrics measuring operation of the one or more services of the host.

13. The non-transitory computer-readable medium of claim 11, wherein the communication link is a Local Area Network over Universal Serial Bus (LAN-over-USB) link.

14. The non-transitory computer-readable medium of claim 11, wherein the code is further configured to:

call the telemetry function of a service of the host through a remote application program interface (API) or a remote procedure call (RPC) procedure.

* * * * *